(12) United States Patent
Engelbrecht et al.

(10) Patent No.: US 12,455,297 B2
(45) Date of Patent: Oct. 28, 2025

(54) TEST SOCKET FOR AND A METHOD OF TESTING ELECTRONIC COMPONENTS, IN PARTICULAR HIGH-POWER SEMICONDUCTOR COMPONENTS

(71) Applicant: Cohu GmbH, Kolbermoor (DE)

(72) Inventors: Stefan Engelbrecht, Bruckmühl (DE); Johann Pötzinger, Fischbachau (DE); Christoph Mederer, Bad Feilnbach (DE); Markus Wagner, Kolbermoor (DE)

(73) Assignee: Cohu GmbH, Kolbermoor (DE)

( * ) Notice: Subject to any disclaimer, the term of this patent is extended or adjusted under 35 U.S.C. 154(b) by 76 days.

(21) Appl. No.: 18/505,405

(22) Filed: Nov. 9, 2023

(65) Prior Publication Data
US 2024/0168055 A1 May 23, 2024

(30) Foreign Application Priority Data
Nov. 18, 2022 (EP) .................... 22208362

(51) Int. Cl.
*G01R 1/04* (2006.01)
(52) U.S. Cl.
CPC ......... *G01R 1/0458* (2013.01); *G01R 1/0466* (2013.01)
(58) Field of Classification Search
CPC ................. G01R 1/07307; G01R 1/07342
See application file for complete search history.

(56) References Cited

U.S. PATENT DOCUMENTS

| | | | |
|---|---|---|---|
| 4,699,593 A * | 10/1987 | Grabbe | H05K 7/1069 439/71 |
| 2005/0059173 A1 | 3/2005 | Chuan et al. | |
| 2007/0252608 A1 | 11/2007 | Koizumi et al. | |
| 2008/0265924 A1 * | 10/2008 | Barabi | G01R 1/0483 324/756.01 |
| 2019/0137545 A1 | 5/2019 | Reischl et al. | |

FOREIGN PATENT DOCUMENTS

| | | |
|---|---|---|
| JP | 2002-270320 A | 9/2002 |
| JP | 2022-036615 A | 3/2022 |
| WO | WO-2012/063858 A1 | 5/2012 |
| WO | WO-2022/031219 A1 | 2/2022 |

OTHER PUBLICATIONS

EP Extended Search Report dated May 10, 2023 in European Patent Application No. 22208362.8.

* cited by examiner

*Primary Examiner* — Tung X Nguyen
(74) *Attorney, Agent, or Firm* — Knobbe, Martens, Olson & Bear, LLP (57) ABSTRACT

A test socket for and a method of testing electronic components, in particular high-power semiconductor components comprise: a plurality of contact elements, being adapted to contact to the electronic component; a holder block for holding and arranging the plurality of contact elements, wherein each contact element of the plurality of contact elements comprises at least one conductive surface portion; wherein the holder block comprises a plurality of electrically conductive support sections, for supporting the conductive surface portions of the plurality of contact elements, wherein the plurality of support sections, makes electrical contact to the plurality of conductive surface portions by supporting the conductive surface portions, and wherein the holder block at least partially transmits a test signal.

19 Claims, 6 Drawing Sheets

TEST SOCKET FOR AND A METHOD OF TESTING ELECTRONIC COMPONENTS, IN PARTICULAR HIGH-POWER SEMICONDUCTOR COMPONENTS

CROSS-REFERENCE TO RELATED APPLICATIONS

This application claims the benefit of the filing date of the European Patent Application No. 22 208 362.8, filed Nov. 18, 2022, the disclosure of which is hereby incorporated herein by reference.

FIELD OF DISCLOSURE

An embodiment of the disclosure relates to a test socket for testing electronic components, in particular, high-power semiconductor components. Further, an embodiment of the disclosure relates to a method of testing electronic components.

ART BACKGROUND

Electronic components are used widely for various application which may include power and high-power applications. In particular, in power inverters and power rectifiers high-power semiconductor components are commonly used. The overall demand for testing such high-power components with increasing capabilities may further grow and require accurate and reliable testing.

SUMMARY OF THE DISCLOSURE

There may be a need to amend testing of electronic components, in particular high-power semiconductor components.

In order to meet the need defined above, a test socket for testing electronic components, in particular high-power semiconductor components, and a method of testing electronic components, in particular high-power semiconductor components are provided according to independent claims.

According to an embodiment of the disclosure a test socket for testing electronic components, such as semiconductor components, and in particular high-power semiconductor components, comprises:
- a plurality of contact elements, being adapted to contact to the electronic component and
- a holder block for holding and arranging the plurality of contact elements, wherein
- each contact element of the plurality of contact elements comprises at least one conductive surface portion, wherein the holder block comprises a plurality of electrically conductive support sections, for supporting the conductive surface portions of the plurality of contact elements, wherein the plurality of support sections makes electrical contact to the plurality of conductive surface portions by supporting the conductive surface portions, and wherein the holder block at least partially transmits a test signal.

According to an embodiment of the disclosure a method of testing electronic components, such as semiconductor components, and in particular high-power semiconductor components, comprises:
- providing a plurality of contact elements, and a holder block for holding and arranging the plurality of contact elements, wherein each contact element of the plurality of contact elements comprises at least one conductive surface portion, wherein the holder block comprises a plurality of electrically conductive support sections, wherein the method further comprises:
- supporting the plurality of conductive surface portions of the plurality of contact elements by the electrically conductive support sections of the holder block,
- providing electrical contact between the plurality of support sections with the plurality of conductive surface portions by supporting the conductive surface portions, and
- transmitting a test signal at least partially by the holder block.

The expression "test socket" may denote a typical unit inside automated test equipment. For testing electronic components, also called "DUTs" (=device under test), the electronic components are fed to a test socket so that one electronic component is contacted to one test socket at a time and a test signal is transmitted from the electronic component or DUT to a tester via the test socket. The expression "plurality of contact elements" may denote electrically conductive terminals inside a contact socket which are used to contact terminals of the DUT. In this sense, the contact elements of the test socket are the crucial parts by which the DUT is electrically contacted and via which the test signal is transmitted to the tester for evaluation of the DUT. The contact elements may comprise at least a "conductive surface portion," which means that at least a part of the outside of the contact element is electrically conductive. The surface of contact element may be completely conductive. The expression "holder block" may denote another, second, crucial part of the test socket. Inside the holder block the plurality of contact elements may be arranged or held so that accurate and reliable contacting of the DUT can be carried out. The holder block may represent a part of the test socket by which the test socket is directly or indirectly mounted to a contact site and/or on a so called DUT board in order to achieve mechanical stability and reliability for testing. The expression "electrically conductive support sections" may denote a part of the holder block, where the surface of the holder block is electrically conductive. The expression "holding and arranging the plurality of contact elements" may denote a mechanical fixation of the contact elements inside the holder block. The expression "supporting the conductive surface portions" may denote that in order to hold and arrange the contact elements, the contact elements and in particular at least one conductive surface portion of the contact element is mechanically held by the support section of the holder block. The surface portion and the support section being electrically conductive and touching to each other in a fixedly way, may result in the consequence that the supporting sections may make an electrical contact to the plurality of conductive surface portions. As a consequence, a test signal originating from the DUT may be transmitted by the electrically conductive surface portion of the contact element towards the electrically conductive support sections of the holder block, and finally further from the holder block—at least partially—towards the DUT board. The holder block may completely be built from a conductive material, e.g. out of metal.

The holder block may be made (completely and monolithically) of a solid material which is electrically conductive, such as metal material. The conductive support sections of the holder block may form together a common surface of the holder block. At least two or all contact elements contact and touch (without interface elements between) the common surface of the holder block so that a common electrical path between the contact elements and the holder block is generated. The contact elements may be in direct contact with a common surface of the holder block. Hence, the contact elements are short cut via the holder element. No interface elements, such as pads or conductive traces may be formed between the contact elements and the holder block. Although the contact elements and the holder block may form the common electrical path, a test signal may be transmitted from the holder block to the contact elements or vice versa. Hence, by providing the direct contact between the contact elements and the holder block, a proper thermal dissipation may be provided.

A gist is to provide a test, in particular a test socket, being capable of carrying a maximized current load according to a growing demand in the field of high-power component usage and testing. Two key elements of a test socket may be the contact elements and a holder block for holding the contact elements. A plurality of contact tips may extend outwardly of a surface of the holder block and may provide electrical contact with one contact terminal of a DUT or electronic device under test, which may in particular be a high-power semiconductor component. The number of contact elements—or contact tips, respectively—contacting to one contact terminal of the DUT may be increased. Further, the contact elements held by the holder block may be in electrical contact with the holder block, where the contact elements touch the holder block. The contact elements touch and electrically connect with the holder block where the holder block clamps or fixes the contact elements. At least surface areas of the holder block and the contact elements may be electrically conductive. As a consequence, the holder block partially transmits the test signal. It is an observation, that the current load can be increased when the holder block transmits the test signal. Furthermore, the holder block may be electrically coupled to a DUT board for transmitting the test signal to a tester. The holder block may consist of a plurality of holder block parts for holding and arranging the plurality of contact elements. In addition to this, the holder block and/or the holder block parts may consist of a plurality of constructive plates which in sum form the holder block and allow for arranging the plurality of contact elements so that contact elements may have different sizes on one hand but may also exert similar contact forces on the contact terminal of the DUT. The holder block parts and/or the constructive plates may be electrically connected to each other, and to the contact elements each of which the holder block part and/or the constructive plate hold or clamp.

According to an exemplary embodiment of the test socket, each of the plurality of contact elements comprises a contact tip, and an elastic portion between the contact tip and the conductive surface portion, wherein the contact tips of the contact elements are adapted to resiliently and mutually contact to the semiconductor component.

The expression "contact tip" may denote a distal end of the contact element by which the contact element mechanically and electrically contacts to terminals of the DUT. The expression "resiliently and mutually" may denote a plurality of contact tips of the electronic component may elastically contact the DUT. In order to provide an elastic movement each of the plurality of contact element may comprise a middle section which may be elastic and which may be called "elastic portion" of the contact element.

According to an exemplary embodiment the test socket further comprises:
a further plurality of contact elements being adapted to contact to the electronic component and
a further holder block for holding and arranging the further plurality of contact elements wherein
each further contact element of the further plurality of contact elements comprises at least one further conductive surface portion, wherein
the further holder block comprises a further plurality of electrically conductive support sections for supporting the further conductive surface portions of the plurality of further contact elements, wherein the plurality of further support sections makes electrical contact to the further plurality of conductive surface portions by supporting the further conductive surface portions, and wherein the further holder block at least partially transmits the test signal.

There may be a further holder block including a further plurality of contact elements for contacting to a different contact terminal of the DUT than the holder block. However, since the purpose of the further holder block is contacting to a high-power component and is therefore identical with the purpose of the holder block, the further holder block may have identical or similar features like the holder block. This may include that the further holder block electrically contacts to the electronic component in a similar way and that the further holder block may consist of further holder block parts and/or further constructive plates like the holder block.

According to an exemplary embodiment of the test socket, each of the further plurality of contact elements comprises a further contact tip and a further elastic portion between the further contact tip and the further conductive surface portion, wherein the further contact tips of the further contact elements are adapted to resiliently and mutually contact to the semiconductor component.

The further plurality of contact elements of the further holder block may be formed in a similar way like the plurality of contact elements of the holder block. Thus, the further holder block with the further contact elements each having a further contact tip, indicating that each further contact element comprises at least one contact tip, i.e. one further contact tip, is similar to the holder block including the plurality of contact tips.

According to an exemplary embodiment the test socket further comprises a first gate contact and a second gate contact, wherein the first gate contact and the second gate contact are adapted to electrically contact to a gate of the semiconductor component formed as a high-power semiconductor component, and wherein the plurality of contact tips are adapted to mutually contact to a source of the high-power semiconductor component, and wherein the further plurality of contact tips are adapted to mutually contact to a drain of the high-power semiconductor component.

For switching a high-power semiconductor component, the high-power semiconductor component may comprise a gate, or more precisely a first gate terminal and a second gate terminal. Therefore, the test socket may comprise a first gate contact electrically contacting to the first gate terminal, and a second gate contact for electrically contacting to the second gate terminal of the high-power semiconductor component. A control signal may be supplied to the gate of the high-power semiconductor component by the first and/or second gate contact of the test socket. Then, if the high-power semiconductor component is activated the contact tips of the holder block mutually contacting to the source and the further contact tips of the further holder block mutually contacting to the drain may allow for measuring or testing the quality of the high-power semiconductor component.

According to an exemplary embodiment of the test socket, the holder block and/or the further holder block consists of a plurality of holder block parts with sets of fins forming slots and wherein the plurality of contact elements, and/or the further plurality of contact elements is/are clamped and arranged by and between the fins in the slots of the plurality of holder block parts, and wherein the clamped contact elements and/or the clamped further contact elements are individually exchangeable.

The holder block may consist of a plurality of holder block parts which in turn may consist of a plurality of constructive plates. This may allow for holding and arranging different contact elements within the holder block and electrically contacting the plurality of contact elements. As already described, the further holder block may consist in a similar way of further holder block parts and/or further constructive plates for the same purpose like the holder block. The holder block and/or the further holder block may clamp the plurality of contact elements or further plurality of contact elements, respectively, so that the contact elements or further contact elements are arranged and held by the holder block and/or the further holder block, respectively. In particular, the holder block and/or the further holder block may comprise fins formed by the constructive plates and/or the further constructive plates, so that the contact elements or further contact elements may be held between the fins or further fins and may be removable or exchangeable.

According to an exemplary embodiment of the test socket, at least one of the slots is an open slot which is free of clamping a contact element and/or a further contact element.

Depending on the high-power semiconductor component to be tested and in particular depending on a distribution of heat occurring on the high-power semiconductor component there may be an appropriate distribution of contact elements and/or of further contact elements needed in order to operate and test the high-power semiconductor component in an efficient and appropriate way. This means, that there may be opens slots within the holder block (or further open slots within the further holder block) where there is no contact element being clamped. This may help to balance the electrical load on the high-power semiconductor component and, as a consequence, to balance heat development on the high-power semiconductor component.

According to an exemplary embodiment of the test socket, the holder block and/or the further holder block comprise(s) a fluid channel for providing heat dissipation.

In order to improve heat dissipation there may be at least one fluid channel inside the holder block and/or the further holder block. A heat exchange fluid, such as liquid nitrogen or any other cooling agent may flow through the fluid channel.

According to an exemplary embodiment of the test socket, the holder block and/or the further holder block is/are resiliently and electrically conductive mounted on a DUT board.

The holder block and the further holder block may be mounted to different terminals on the DUT board to make electrical contact to the different terminals of the DUT board. In addition, or as an alternative to being fixedly mounted on, the holder block or the further holder block may be resiliently and electrically conductive mounted on a DUT board. By resiliently mounting the holder block and/or the further holder block to the DUT board, contact and contact force of the contact elements and/or of the further contact elements, respectively, may be adjusted.

According to an exemplary embodiment of the test socket, the contact elements, the further contact elements, the first gate contact, and/or the second gate contact are formed as cantilever contact springs, pogo pins, and/or comprise a hook-like shape.

Various embodiments of contact elements as parts of a contact socket for testing electronic components are known and be combined. So called cantilever contact springs, pogo pins, and/or contact elements having a hook-like shape may be used in any combination within the contact socket.

According to an exemplary embodiment of the method of testing electronic components, each of the plurality of contact elements comprises a contact tip and an elastic portion between the contact tip and the conductive surface portion, wherein the method further comprises:
  mutually and resiliently contacting the semiconductor component with the contact tips of the contact elements.

According to an exemplary embodiment the method of testing electronic components further comprises:
  providing a further plurality of contact elements being adapted to contact to the electronic component, and a further holder block for holding and arranging the further plurality of contact elements, wherein each further contact element of the further plurality of contact elements comprises at least one further conductive surface portion, wherein the further holder block comprises a further plurality of electrically conductive support sections, wherein the method further comprises:
  supporting the further conductive surface portions of the plurality of further contact elements by the further plurality of electrically conductive support sections,
  providing electrical contact between the plurality of further support sections with the further plurality of conductive surface portions by supporting the further conductive surface portions, and
  transmitting the test signal at least partially by the further holder block.

According to an exemplary embodiment of the method of testing electronic components, each of the further plurality of contact elements comprises a further contact tip and a further elastic portion between the further contact tip and the further conductive surface portion, wherein the method further comprises:
  mutually and resiliently contacting to the semiconductor component with the further contact tips of the further contact elements.

According to an exemplary embodiment of the method of testing electronic components, the semiconductor component is formed as a high-power semiconductor component, wherein the method further comprises:
  providing a first gate contact and a second gate contact and
    electrically contacting a gate of the high-power semiconductor component with the first gate contact and the second gate contact,
    mutually contacting a source of the high-power semiconductor component with the plurality of contact tips, and
    mutually contacting a drain of the high-power semiconductor component with the further plurality of contact tips.

According to an exemplary embodiment of the method of testing electronic components, the holder block and/or the further holder block consist(s) of a plurality of holder block parts with sets of fins forming slots, wherein the method further comprises:

clamping and arranging the plurality of contact elements, and/or the further plurality of contact elements by and between the fins in the slots of the plurality of holder block parts, and individually exchanging the clamped contact elements and/or the clamped further contact elements.

According to an exemplary embodiment, the method of testing electronic components further comprises:

leaving at least one of the slots as an open slot which is free of clamping a contact element and/or a further contact element.

According to an exemplary embodiment of the method of testing electronic components, the holder block and/or the further holder block comprise(s) at least one fluid channel, wherein the method further comprises:

dissipating heat by the at least one fluid channel.

According to an exemplary embodiment, the method of testing electronic components, according to any of the preceding claims 11 to 18 further comprises:

resiliently and electrically conductive mounting the holder block and/or the further holder block on a DUT board.

According to an exemplary embodiment the method of testing electronic components further comprises:

forming the contact elements, the further contact elements, the first gate contact, and/or the second gate contact as cantilever contact springs, pogo pins, and/or as having a hook-like shape.

It has to be noted that embodiments of the disclosure have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present disclosure are apparent from the examples of embodiment to be described hereinafter and are explained with reference to the examples of embodiment. The disclosure will be described in more detail hereinafter with reference to examples of embodiment but to which the disclosure is not limited.

DETAILED DESCRIPTION OF EXEMPLARY EMBODIMENTS

The illustrations in the drawings are schematic. It is noted that in different figures similar or identical elements are provided with the same reference signs.

Figure 1:
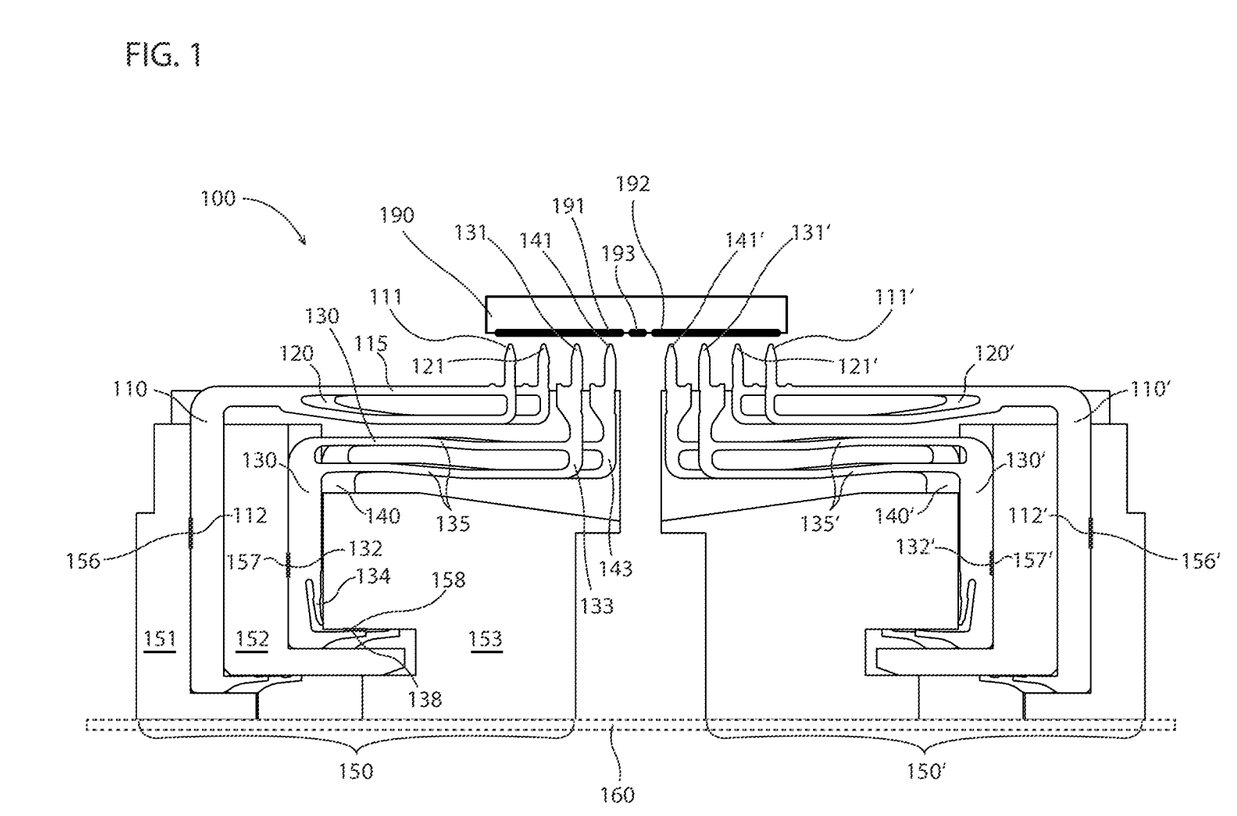
FIG. 1 shows a sectional view of a test socket in an embodiment according to the disclosure.

FIG. 1 shows a sectional view of a test socket 100 in an embodiment according to the disclosure. The test socket 100 is adapted to test an electronic component 190, in particular a high-power semiconductor component, comprising three contact pads, including source 191, gate 193, and drain 192.

The test socket 100 shown in FIG. 1 comprises a holder block 150 and a group of 4 contact elements 110, 120, 130, 140 being held by and in the holder block 150. A further holder block 150' and a respective further group of 4 contact elements 110', 120', 130', 140' is reflectively arranged relative to the holder block 150 and basically identical with the holder block 150 the 4 contact elements 110, 120, 130, 140. Therefore, only the holder block 150 is described with detail, and a description of the further holder block 150 with the further group of 4 contact elements 110, 120, 130, 140 is omitted for this reason.

A group of a first contact element 110, a second contact element 120, a third contact element 130, and a fourth contact element 140 comprise a first contact tip 111, a second contact tip 121, a third contact tip 131, and a fourth contact tip 141, respectively, wherein the first contact tip 111, the second contact tip 121, the third contact tip 131, and the fourth contact tip 141 protrude from the holder block 150. The group of the first contact element 110, the second contact element 120, the third contact element 130, and the fourth contact element 140 are adapted to contact mutually to the source 191 with the first contact tip 111, the second contact tip 121, the third contact tip 131, and the fourth contact tip 141, respectively.

The group of the first contact element 110, the second contact element 120, the third contact element 130, and the fourth contact element 140 are supported and arranged within a holder block 150, wherein the holder block 150 may consist of first holder block part 151, a second holder block part 152, and a third holder block part 153. The first holder block part 151, the second holder block part 152, and the third holder block part 153 may be electrically coupled to each other, so that the holder block 150 may be seen as a whole, and may couple to a DUT board 160, which in turn transmits an electrical signal originating from the electronic component 190 to a tester (not shown).

According to a gist the three block parts 151, 152, 153 and/or the group of the contact elements 110, 120, 130, 140 may be electrically coupled to each other directly or indirectly. That is, also the group of the four contact elements may couple electrically to each other, directly or indirectly. By this, a common conductive path, or a plurality of conductive paths may couple the source 191 of the electronic component 190 with the holder block 150 and finally to the DUT board 160.

However, to explicate this, there may be a restricted requirement for electrical connecting the holder block and the contact elements to each other in a form that, e.g. the first contact element 110 may comprise a conductive surface portion 112 mechanically and thus electrically coupling to a conductive support section 156 of the first holder block part 151. In a similar way, a further conductive surface portion 132 of the third contact element 130 may electrically couple to a conductive support section 157 of the second holder block part 152.

The third contact element 130 (as well as any other contact element) may comprise a clamping member 134, and a further clamping member 138 which may allow for holding and arranging the third contact element 130 within the holder block 150. In particular, and without limitation to this electrical contact, the further clamping member 138 may mechanically and electrically couple to a support section 158 of the third holder block part 153.

There are numerous ways thinkable to arrange a group of contact elements within a holder block and thus electrically couple a contact pad of an electronic component via contact elements and a holder block and finally to a DUT board.

The third contact element 130 (as well as any other contact element) may comprise two or even more of flexible beams 135 to support a resilient end portion 133 of the third contact element 130 and thus to exert a defined force from the third contact tip 131 towards the source 191 when the high-power semiconductor component 190 is contacted. E.g., the fourth contact element 140 may comprise a resilient end portion 143 so that the fourth contact tip 141 also exerts a defined force on the source 191 of the high-power semiconductor component 190.

Figure 2A:
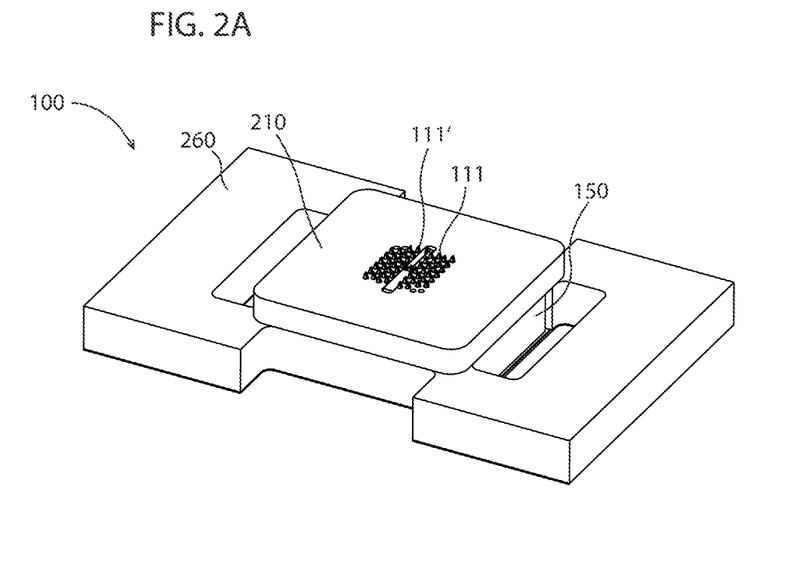
FIG. 2A shows a test socket for testing high-power components in a perspective view.

FIG. 2A shows a test socket 100 for testing electronic components 190, in particular high-power components in a perspective view. The test socket 100 comprises the holder block 150 being mounted on a base plate 260 and covered by a cover plate 210. The contact tip 111 and a further contact tip 111' (and many further contact tips) penetrate the cover plate 210.

Figure 2B:
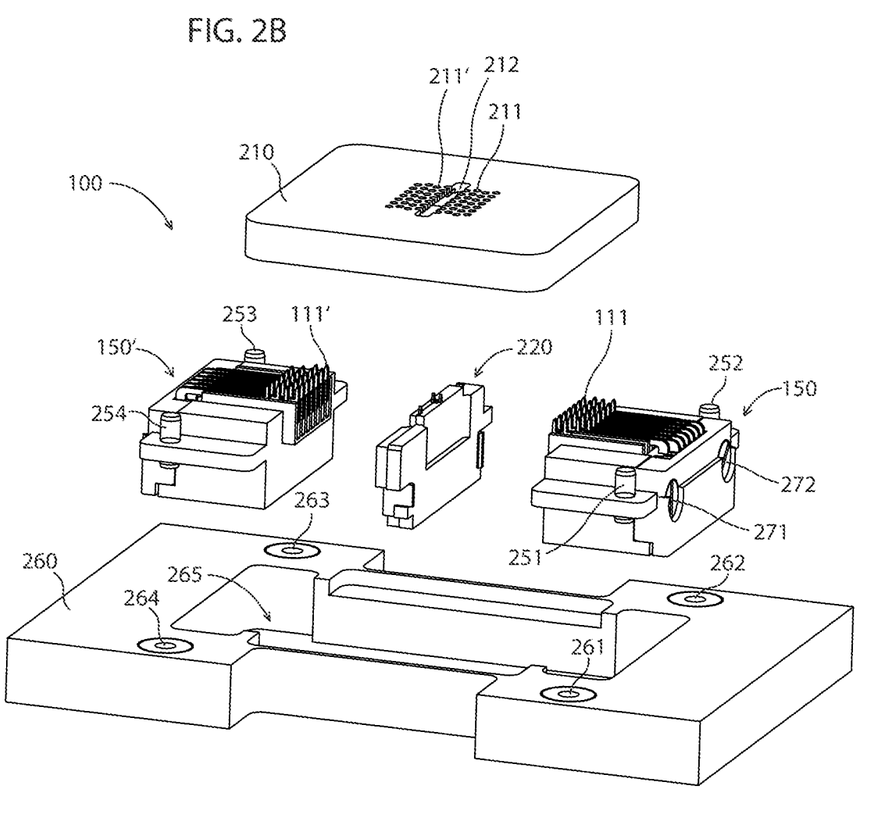
FIG. 2B shows the test socket of FIG. 2A in an exploded view.

FIG. 2B shows the test socket of FIG. 2A in an exploded view. The cover plate 210 comprises a plurality of through holes 211, 211 through which the plurality of contact tips 111, 111' (see FIG. 2A) protrude. Through a gate slot 212 a gate block 220 may be inserted. Opposite to the holder block 150 there is a largely identical further holder block 150' and in between there is the gate block 220. The contact tips 111 protruding the holder block 150 may contact to the source 191 of the high-power component 190, the further contact tips 111' protruding the further holder block 150' may contact to the drain 192, and the gate block 220 may provide an electrical connection to the gate 193 of the electronic component 190 (see also FIG. 1). The holder block 150, the further holder block 150' and the gate block 220 may be inserted and mounted into an opening of the base plate 260. The holder block 150 may comprise a first alignment pin 251 and a second alignment pin 252 which engage with a first alignment hole 261 and a second alignment hole 262 of the base plate 260, respectively, thus allowing for mounting the holder block 150 on the base plate 260. Equally, the further holder block 150' may comprise a third alignment pin 253 and a fourth alignment pin 254 which engage with a third alignment hole 263 and a fourth alignment hole 264 of the base plate 260, respectively, to allow for mounting the further holder block 150' on the base plate 260, as well.

Figures 3A, 3B:
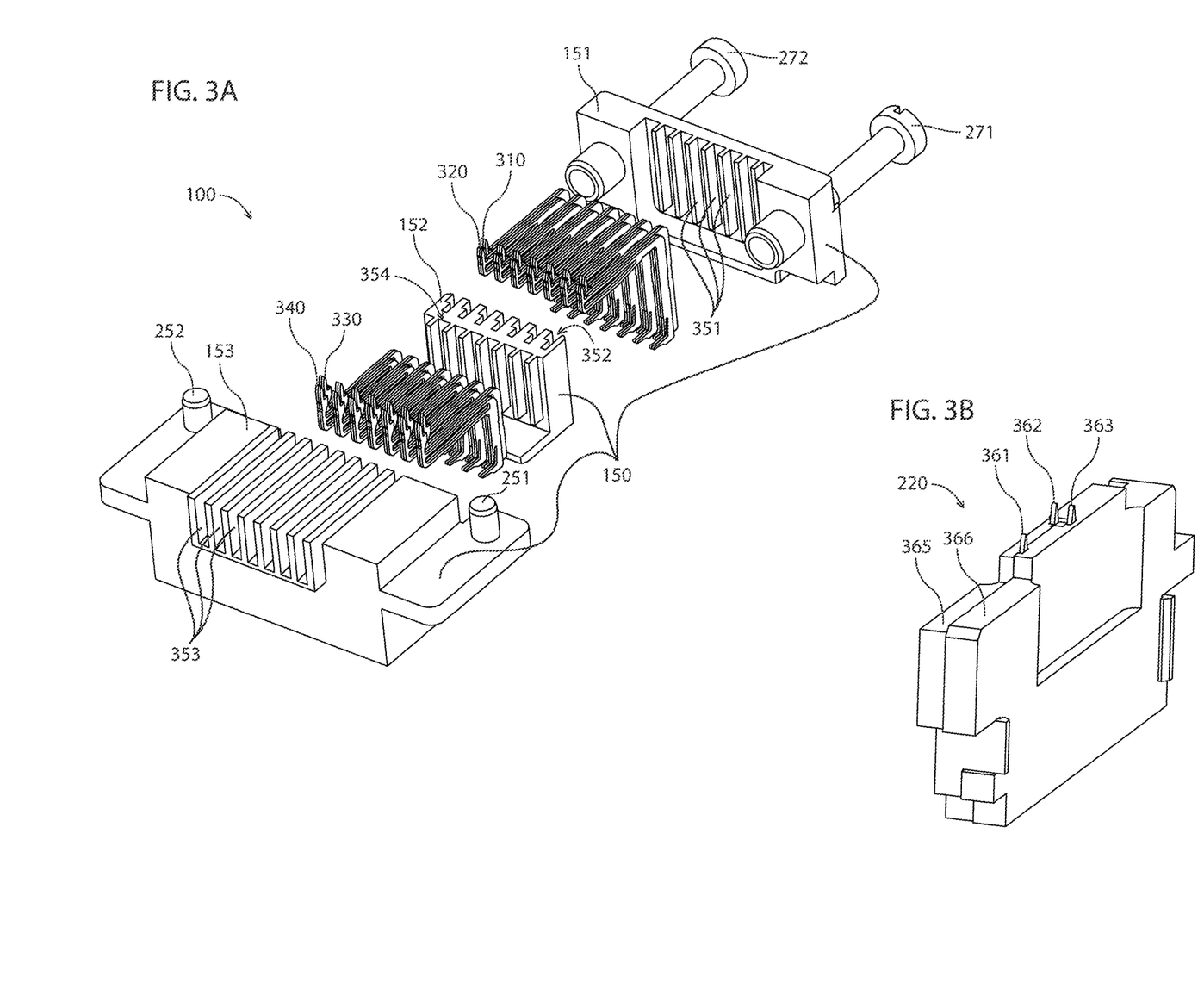
FIG. 3A shows the test socket of FIG. 1 in an exploded view.
FIG. 3B shows the gate block of the test socket of FIG. 2B in an enlarged and perspective view.

A first screw 271 and a second screw 272 can be seen on a rear side of the holder block 150 and their function will be described with the following FIG. 3A. FIG. 3A shows the test socket 100 of FIG. 1 in an exploded view. The first screw 271 and the second screw 272 may allow for fixing the first holder block part 151, the second holder block part 152, and the third holder block part 153 together, wherein the second holder block part 152 is positioned between the first holder block part and the third holder block part 153. Each of the holder block parts 151, 152, 153 may comprise a set of fins 351, 352, 353 for aligning and fixing four rows of sets of four contact elements 310, 320, 330, 340. The second holder block part 152 may comprise a further, fourth set of fins 354. The first row 310 of sets of four contact elements and the second row 320 of sets of four contact elements may be both arranged and fixed between the first set of fins 351 of the first holder block part 151 and the second set of fins 352 of the second holder block part 152. In an analogue manner, are the third row 330 of the sets of four contact elements and the fourth row 340 of the sets of four contact elements both arranged and fixed between the third set of fins 353 of the third holder block part 153 and the fourth set of fins 354 of the second holder block part 352. The contact elements 111, 121, 131, 141 of the groups of four contact elements may be arranged stepwise to each other (see also FIG. 1), and due to the contact elements, formed as cantilever contact springs, the respective beams or cantilevers may have different lengths and dimensions and due to this each fin may have an additional step inside. This may allow for each of the contact elements or cantilever contact springs to exert an equal and defined force on a pad of the electronic component.

FIG. 3B shows the gate block 220 of the test socket 100 of FIG. 2B in an enlarged and perspective view. The gate block 220 may comprise a first clip 365 and a second clip 366 being clipped to each other and by this holding and arranging three contact elements, a first gate contact 361, a second gate contact 362 for operating the high-power component, and a Kelvin contact 363 for monitoring proper contacting of the first gate contact 361, and the second gate contact 362. The first clip 365 and the second clip 366 may both be made of an electrically insulating material, so that the holder block 150 and the further holder block 150' (see also FIG. 2B) are electrically insulated from each other when being mounted on the base plate 260 (see also FIG. 2A).

Figure 4A:
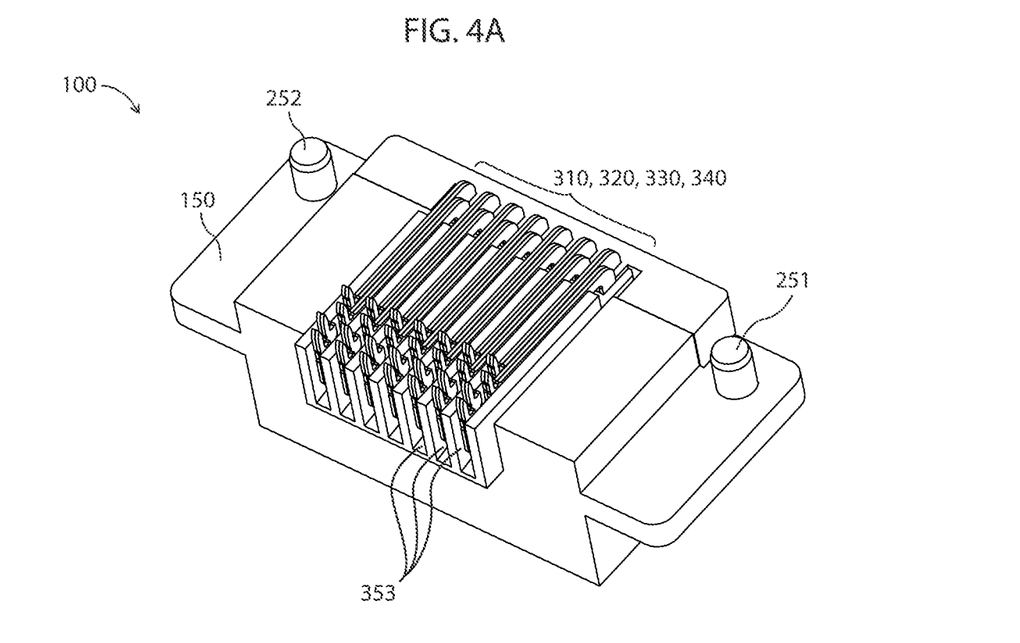
FIG. 4A shows the test socket of FIG. 1 and FIG. 3A completely filled with contact elements.

FIG. 4A shows the test socket of FIG. 1 and FIG. 3A completely filled with contact elements (110, 120, 130, 140). The first row 310, the second row 320, the third row 330, and the fourth row 340 of groups of four contact elements are completed and fill each possible position or slot 353 inside the holder block 150.

Figure 4B:
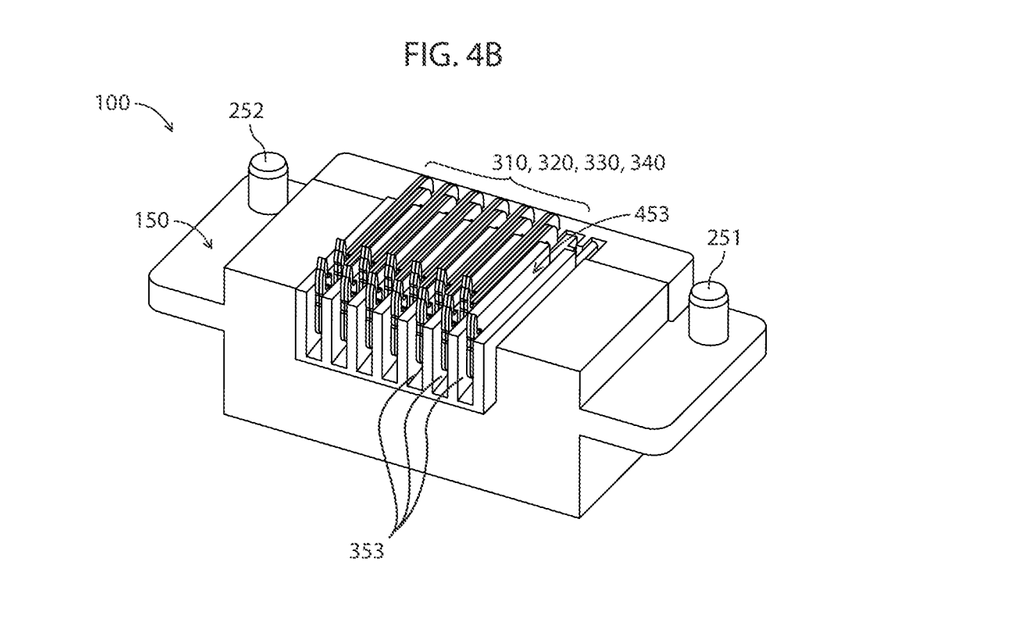
FIG. 4B shows the test socket of FIG. 1 and FIG. 3A only partially filled with contact elements.

In contrast to FIG. 4A, shows FIG. 4B the test socket of FIG. 1 and FIG. 3A only partially filled with contact elements. On the right side of the contact block 150, shown in a perspective view, there are open slots 354 in which no contact element has been inserted, so that the slots 353 are not completely filled.

Figure 5A:
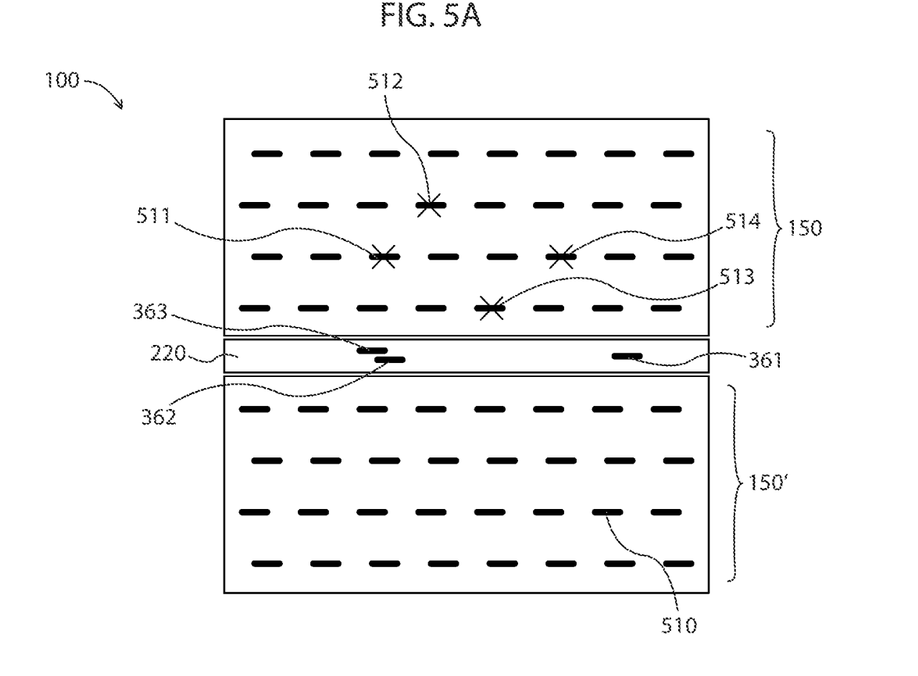
FIG. 5A shows an example of a test socket partially filled with contact elements in a schematic planar view.

FIG. 5A shows an example of a test socket 100 partially filled with contact elements in a schematic planar view. The test socket 100 may comprise a holder block 150 comprising a first open position 511, a second open position 512, a third open position 513, and a fourth open position 514, the four open positions being distributed over an area of the holder block 150 which distribution may fulfil a requirement of both an electrical load and defined heat dissipation when operating a specific electronic component. In contrast, all possible positions 510 of the further holder block 150' may be completely filled with contact elements. The gate block 220 may electrically insulate the holder block 150 and the further holder block 150' from each other.

Figure 5B:
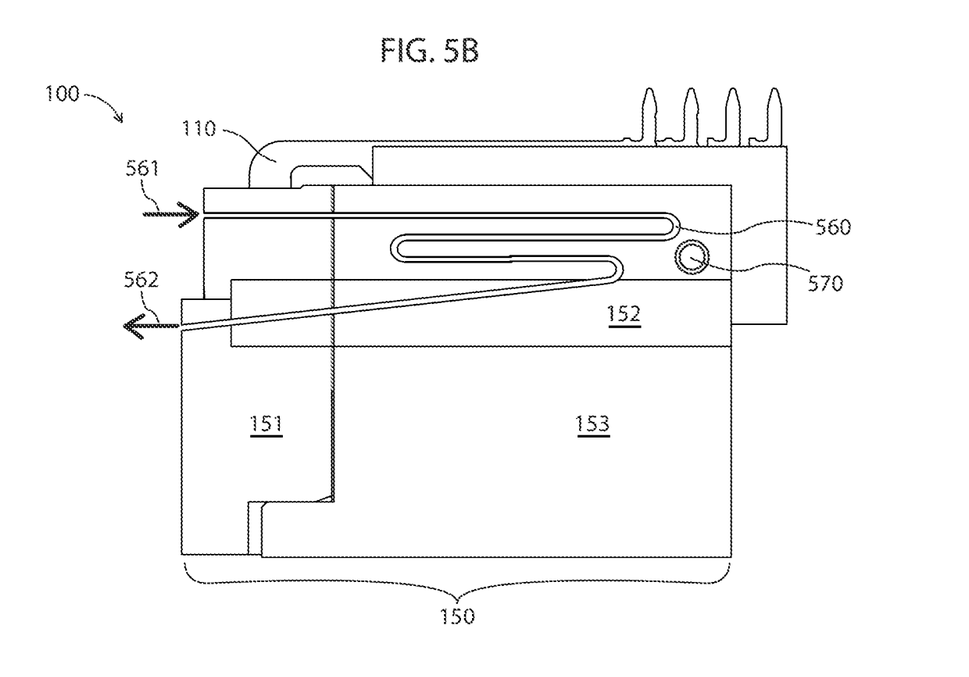
FIG. 5B shows the test socket of FIG. 1 in a sectional view with cooling channels.

FIG. 5B shows the test socket 100 of FIG. 1 in a sectional view comprising a cooling channel 560. The cooling channel 560 may comprise an inlet 561 and an outlet 562 through which a cooling fluid, such as cooled air or cooled nitrogen may be provided. The cooling channel 560 may extend through the complete holder block 150, in particular, the first holder block part 151, and the second holder block part 152, as shown. The holder block 150 may comprise a sensor 570, such as a temperature sensor, and the like, attached to or inside the holder block 150.

Figure 6:
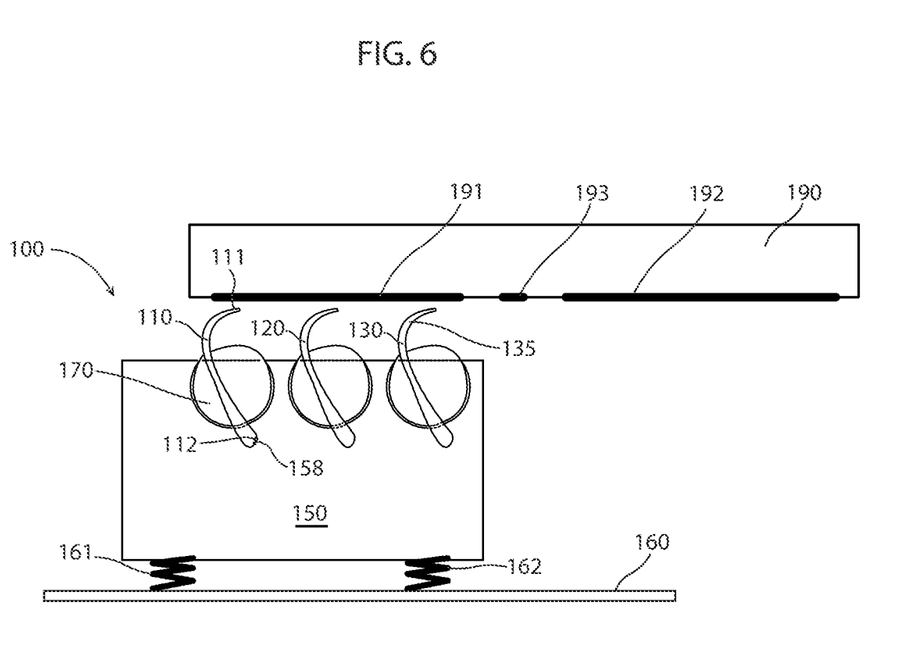
FIG. 6 shows a sectional view of a test socket in a further embodiment according to the disclosure.

FIG. 6 shows a sectional view of a test socket 100 in another embodiment according to the disclosure. In a similar way as shown with FIG. 1 the test socket may comprise a group of three contact elements 110, 120, 130 which contact to the source 191 of the electronic component 190. The first contact element may be hook-shaped and thus a first contact tip 111 of the first contact element 110 may be resiliently exerting a force on the source 191 of the electronic component 190. The first contact element 110 (the same may apply to the other contact elements) may be aligned and held within the holder block 150 by a resilient member 170. A conductive surface portion 112 of the first contact element 110 and a conductive support section 156 of the holder block 150 make electrical contact to each other. As an alternative or in addition, for exerting a defined force on the source 191, the holder block 150 may be coupled to the DUT board 160 by a first conductive spring 161 and a second conductive spring 162.

It should be noted that the term "comprising" does not exclude other elements or steps and "a" or "an" does not exclude a plurality. Also, elements described in association with different embodiments may be combined. It should be noted that reference signs in the claims should not be construed as limiting the scope of the claims.

The invention claimed is:

1. A test socket for testing electronic components, such as semiconductor components, and in particular high-power semiconductor components, the test socket comprising:
  a plurality of contact elements being adapted to contact an electronic component; and
  a holder block for holding and arranging the plurality of contact elements, wherein
  each contact element of the plurality of contact elements comprises at least one conductive surface portion, wherein the holder block comprises a plurality of electrically conductive support sections for supporting the conductive surface portions of the plurality of contact elements, wherein the plurality of electrically conductive support sections electrically contacts the plurality of conductive surface portions by supporting the conductive surface portions, and wherein the holder block at least partially transmits a test signal.

2. The test socket for testing electronic components according to claim 1, wherein each of the plurality of contact elements comprises a contact tip and an elastic portion between the contact tip and the conductive surface portion, wherein the electronic component is a semiconductor component, and wherein the contact tips of the contact elements are adapted to resiliently and mutually contact the semiconductor component.

3. The test socket for testing electronic components according to claim 2, further comprising:
  a further plurality of contact elements being adapted to contact the electronic component; and
  a further holder block for holding and arranging the further plurality of contact elements, wherein
  each further contact element of the further plurality of contact elements comprises at least one further conductive surface portion, wherein
  the further holder block comprises a further plurality of electrically conductive support sections for supporting the further conductive surface portions of the plurality of further contact elements, wherein the plurality of further support sections electrically contacts to the further plurality of conductive surface portions by supporting the further conductive surface portions, and wherein the further holder block at least partially transmits the test signal.

4. The test socket for testing the electronic component according to claim 3, wherein each of the further plurality of contact elements comprises a further contact tip and a further elastic portion between the further contact tip and the further conductive surface portion, wherein the further contact tips of the further contact elements are adapted to resiliently and mutually contact the semiconductor component.

5. The test socket for testing electronic components according to claim 4, further comprising a first gate contact and a second gate contact, wherein the first gate contact and the second gate contact are adapted to electrically contact a gate of the semiconductor component formed as a high-power semiconductor component, and wherein the contact tips are adapted to mutually contact a source of the high-power semiconductor component, and wherein the further contact tips are adapted to mutually contact a drain of the high-power semiconductor component.

6. The test socket for testing electronic components according to claim 1, wherein the holder block consists of a plurality of holder block parts with sets of fins forming slots and wherein the plurality of contact elements is clamped and arranged by and between the fins in the slots of the plurality of holder block parts, and wherein the clamped contact elements are individually exchangeable.

7. The test socket for testing electronic components according to claim 6, wherein at least one of the slots is an open slot which is free of clamping one or more of the contact elements.

8. The test socket for testing electronic components according to claim 1, wherein the holder block comprises a fluid channel for providing heat dissipation.

9. The test socket for testing electronic components according to claim 1, wherein the holder block is resiliently and electrically conductive mounted on a DUT board.

10. The test socket for testing electronic components according to claim 5, wherein the contact elements, the first gate contact, and/or the second gate contact are formed as cantilever contact springs, pogo pins and/or comprise a hooklike shape.

11. A method of testing electronic components, such as semiconductor components, and in particular high-power semiconductor components, the method comprising:
  providing a plurality of contact elements configured to contact an electronic component, and a holder block for holding and arranging the plurality of contact elements, wherein each contact element of the plurality of contact elements comprises at least one conductive surface portion, wherein the holder block comprises a plurality of electrically conductive support sections;
  supporting the plurality of conductive surface portions of the plurality of contact elements by the electrically conductive support sections of the holder block;
  providing electrical contact between the plurality of support sections with the plurality of conductive surface portions by supporting the conductive surface portions; and transmitting a test signal at least partially by the holder block.

12. The method of testing electronic components according to claim 11, wherein each of the plurality of contact elements comprises a contact tip and an elastic portion between the contact tip and the conductive surface portion, wherein the electronic component is a semiconductor component, the method further comprising:
mutually and resiliently contacting the semiconductor component with the contact tips of the contact elements.

13. The method of testing electronic components according to claim 12, further comprising:
providing a further plurality of contact elements being adapted to contact the electronic component, and a further holder block for holding and arranging the further plurality of contact elements, wherein each further contact of the further plurality of contact elements comprises at least one further conductive surface portion, wherein the further holder block comprises a further plurality of electrically conductive support sections;
supporting the further conductive surface portions of the plurality of further contact elements by the further plurality of electrically conductive support sections;
providing electrical contact between the plurality of further support sections with the further plurality of conductive surface portions by supporting the further conductive surface portions; and
transmitting the test signal at least partially by the further holder block.

14. The method of testing electronic components according to claim 13, wherein each of the further plurality of contact elements comprises a further contact tip and a further elastic portion between the further contact tip and the further conductive surface portion, wherein the method further comprises:
mutually and resiliently contacting the semiconductor component with the further contact tips of the further contact elements.

15. The method of testing electronic components according to claim 14, the semiconductor component formed as a high-power semiconductor component, and the method further comprising:
providing a first gate contact and a second gate contact;
electrically contacting a gate of the high-power semiconductor component with the first gate contact and the second gate contact;
mutually contacting a source of the high-power semiconductor component with the contact tips; and
mutually contacting a drain of the high-power semiconductor component with the further contact tips.

16. The method of testing electronic components according to claim 11, wherein the holder block consists a plurality of holder block parts with sets of fins forming slots, the method further comprising:
clamping and arranging the plurality of contact elements by and between the fins in the slots of the plurality of holder block parts; and
individually exchanging the clamped contact elements.

17. The method of testing electronic components according to claim 16, further comprising:
leaving at least one of the slots as an open slot which is free of clamping one or more of the contact elements.

18. The method of testing electronic components according claim 11, wherein the holder block comprises at least one fluid channel, the method further comprising:
dissipating heat by the at least one fluid channel.

19. The method of testing electronic components according to claim 15, further comprising:
resiliently and electrically conductive mounting the holder block on a DUT board; and/or
forming the contact elements, the first gate contact, and/or the second gate contact as cantilever contact springs, pogo pins and/or as having a hook-like shape.

* * * * *